US012511572B2

(12) United States Patent
Castrillo et al.

(10) Patent No.: US 12,511,572 B2
(45) Date of Patent: Dec. 30, 2025

(54) ESTIMATING THE FIDELITY OF QUANTUM LOGIC GATES AND QUANTUM CIRCUITS

(71) Applicant: Google LLC, Mountain View, CA (US)

(72) Inventors: Sergio Boixo Castrillo, Rancho Palos Verdes, CA (US); Vadim Smelyanskiy, Mountain View, CA (US); Hartmut Neven, Malibu, CA (US); Alexander Korotkov, Riverside, CA (US)

(73) Assignee: Google LLC, Mountain View, CA (US)

( * ) Notice: Subject to any disclaimer, the term of this patent is extended or adjusted under 35 U.S.C. 154(b) by 946 days.

(21) Appl. No.: 17/623,128

(22) PCT Filed: Oct. 30, 2019

(86) PCT No.: PCT/US2019/058775
§ 371 (c)(1),
(2) Date: Dec. 27, 2021

(87) PCT Pub. No.: WO2020/263304
PCT Pub. Date: Dec. 30, 2020

(65) Prior Publication Data
US 2022/0230087 A1     Jul. 21, 2022

Related U.S. Application Data

(60) Provisional application No. 62/868,525, filed on Jun. 28, 2019.

(51) Int. Cl.
*G06N 10/70* (2022.01)
*G06N 10/20* (2022.01)
*G06N 10/40* (2022.01)

(52) U.S. Cl.
CPC ............. *G06N 10/70* (2022.01); *G06N 10/20* (2022.01); *G06N 10/40* (2022.01)

(58) Field of Classification Search
CPC ......... G06N 10/70; G06N 10/40; G06N 10/20
See application file for complete search history.

(56) References Cited

U.S. PATENT DOCUMENTS 8,149,494 B1 * 4/2012 Spence .................. G02F 1/21
                                                    359/639
11,829,846 B2 * 11/2023 Bouland ................. G06F 17/18
(Continued)

FOREIGN PATENT DOCUMENTS

| CA | 3024197 | 11/2017 |
|---|---|---|
| CN | 109074518 | 12/2018 |
| CN | 109478258 | 3/2019 |

OTHER PUBLICATIONS

[No Author Listed] "OpenMP application program interface version 3.0," OpenMP Architecture Review Board, May 2008, 326 pages.
(Continued)

*Primary Examiner* — David E Choi
(74) *Attorney, Agent, or Firm* — Fish & Richardson P.C.

(57) ABSTRACT

Methods, systems and apparatus for estimating the fidelity of quantum logic gates. In one aspect, a method includes defining multiple sets of random quantum circuits; for each set of random quantum circuits: selecting an observable for each element in the set of random quantum circuits, wherein each selected observable corresponds to a respective element of the set of random quantum circuits and is dependent on the element to which it corresponds; estimating a value of a polarization parameter for the set of random quantum circuits, comprising performing a least mean squares minimization based on multiple expectation values, wherein each expectation value comprises an expectation value of a respective selected observable with respect to an output of an experimental implementation of a random quantum circuit corresponding to the respective selected observable; and processing the estimated polarization parameter values to (Continued)

obtain an estimate of the fidelity of the n-qubit quantum logic gate.

26 Claims, 4 Drawing Sheets

(56)  References Cited

U.S. PATENT DOCUMENTS

| | | | | |
|---|---|---|---|---|
| 2007/0053404 | A1* | 3/2007 | Makino | B82Y 20/00 372/96 |
| 2013/0050707 | A1* | 2/2013 | Parks | B82Y 10/00 356/450 |
| 2016/0328211 | A1* | 11/2016 | Nordholt | G06F 7/588 |
| 2019/0095561 | A1* | 3/2019 | Pednault | G06F 17/16 |
| 2019/0156239 | A1* | 5/2019 | Martinis | G06N 10/70 |
| 2019/0347575 | A1* | 11/2019 | Pednault | G06N 10/20 |
| 2019/0377553 | A1* | 12/2019 | Maynard | G06F 7/58 |
| 2019/0378033 | A1* | 12/2019 | Figgatt | G06N 10/70 |
| 2020/0026888 | A1* | 1/2020 | Mobley | G09C 1/00 |
| 2020/0175409 | A1* | 6/2020 | Kandala | G06N 10/40 |
| 2021/0192114 | A1* | 6/2021 | Boixo Castrillo | G06F 30/3308 |
| 2022/0230087 | A1* | 7/2022 | Castrillo | G06N 10/20 |
| 2022/0374750 | A1* | 11/2022 | Smelyanskiy | G06N 10/70 |
| 2023/0385674 | A1* | 11/2023 | Wan | G06N 10/20 |
| 2024/0020564 | A1* | 1/2024 | Ubaru | G06N 10/00 |
| 2024/0354620 | A1* | 10/2024 | García Pérez | G06N 10/40 |
| 2025/0021860 | A1* | 1/2025 | Smith | G06N 10/00 |
| 2025/0077925 | A1* | 3/2025 | Pisenti | G06N 10/20 |
| 2025/0139481 | A1* | 5/2025 | Aleksandrowicz | G06N 10/70 |
| 2025/0209356 | A1* | 6/2025 | Elfving | G06N 10/20 |

OTHER PUBLICATIONS

Aaronson et al., "Bosonsampling is far from uniform," Quantum Information & Computation, Nov. 2014, 14(15-16)1383-1423.
Aaronson et al., "Complexity-Theoretic Foundations of Quantum Supremacy Experiments," CoRR, Dec. 16, 2016, arXiv:1612.05903, 66 pages.
Aaronson et al., "The computational complexity of linear optics," STOC '11: Proceedings of the forty-third annual ACM symposium on Theory of computing, Jun. 2011, pp. 333-342.
Aaronson, "Quantum computing, postselection, and probabilistic polynomial-time," Proc. Roy. Soc. London Ser., Sep. 2005, 461(2063):3473-3482.
Aaronson, "Quantum lower bound for recursive Fourier sampling," Quantum Information & Computation, Mar. 2003, 3(2):165-174.
Albash et al., "Reexamining classical and quantum models for the D-Wave One processor," EPJ ST, Feb. 5, 2015, 224:111-129.
Ambainis et al., "Quantum t-designs: t-wise Independence in the Quantum World," Twenty-Second Annual IEEE Conference on Computational Complexity, Jun. 2007, 19 pages.
Arkhipov, "BosonSampling is robust against small errors in the network matrix," Phys. Rev. A., Dec. 14, 2015, 92:062326.
Arnaud et al., "Efficiency of producing random unitary matrices with quantum circuits," Phys. Rev. A, Dec. 2008, 78(062329):18 pages.
Austin et al., "Performance Measurements of the NERSC Cray Cascade System," Cray, Inc., May 2013, 8 pages.
Barends et al., "Digital quantum simulation of fermionic models with a superconducting circuit," Nat. Comm., Jul. 8, 2015, 6:7654.
Barends et al., "Digitized adiabatic quantum computing with a superconducting circuit," Nature, Jun. 2016, 534(7606):222-6.
Barends et al., "Superconducting quantum circuits at the surface code threshold for fault tolerance," Nature, Apr. 24, 2014, 508(7497):15 pages.
Beals et al., "Efficient distributed quantum computing," Proc. Roy. Soc. London Ser. A, May 8, 2013, 469:20120686.
Beenakker, "Random-matrix theory of quantum transport," Rev. Mod. Phys., Jul. 1997, 69(731):85 pages.

Boixo et al., "Computational multiqubit tunnelling in programmable quantum annealers," Nat. Comm., Jan. 7, 2016, 7:10327.
Boixo et al., "Evidence for quantum annealing with more than one hundred qubits.," Nat. Phys., Mar. 2014, 10(3)218-224.
Boixo et al., "Operational Interpretation for Global Multipartite Entanglement," Phys. Rev. Lett., Mar. 14, 2008, 100:100503.
Boxio et al., "Characterizing quantum supremacy in near-term devices," Nature Physics, Apr. 2018, 14:595-600.
Brandao et al., "Local random quantum circuits are approximate polynomial-designs," CoRR, Aug. 3, 2021, arXiv:1208.0692, 39 pages.
Bravyi et al., "Improved classical simulation of quantum circuits dominated by Clifford gates," CoRR, Jan. 27, 2016, arXiv:1601.07601, 20 pages.
Bremner et al., "Achieving quantum supremacy with sparse and noisy commuting quantum computations," Quantum, Apr. 25, 2017, 1:8.
Bremner et al., "Average-Case Complexity Versus Approximate Simulation of Commuting Quantum Computations," Phys. Rev. Lett., Aug. 2016, 117:080501.
Bremner et al., "Classical simulation of commuting quantum computations implies collapse of the polynomial hierarchy," Proc. Roy. Soc. London Ser. A, Feb. 2011, 467(2126):13 pages.
Brown et al., "Convergence Rates for Arbitrary Statistical Moments of Random Quantum Circuits," Phys. Rev. Lett., Jun. 2010, 104:250501.
Brown et al., "Quantum chaos, delocalization, and entanglement in disordered Heisenberg models," Phys. Rev., Feb. 7, 2008, E77:021106.
Brown et al., "Scrambling speed of random quantum circuits," CoRR, Oct. 2012, arXiv:1210.6644, 24 pages.
Carlo et al., "Simulating noisy quantum protocols with quantum trajectories," Phys. Rev., Jun. 18, 2004, A69:062317.
Dahlsten et al., "The emergence of typical entanglement in two-party random processes," J. Phys. A: Mathematical and Theoretical, Jun. 2007, 40(8081):32 pages.
De las Cuevas et al., "Quantum algorithms for classical lattice models," New J. Phys., Sep. 9, 2011, 13:093021.
De Luca et al., "Ergodicity breaking in a model showing many-body localization," Europhysics Letters, Feb. 15, 2013, 101(3):37003.
Emerson et al., "Convergence conditions for random quantum circuits," Phys. Rev. A, Dec. 2, 2005, 72:060302.
Emerson et al., "Pseudo-Random Unitary Operators for Quantum Information Processing," Science, Dec. 2003, 302(5653):2098-2100.
Emerson et al., "Scalable noise estimation with random unitary operators," J. Opt B: Quantum Semiclass Optics, Sep. 21, 2005, 7:S347.
Erhard et al., "Characterizing large-scale quantum computers via cycle benchmarking," Nature Communications, Nov. 2019, 10(5357):7 pages.
Farhi et al., "Quantum Supremacy through the Quantum Approximate Optimization Algorithm," CoRR, Feb. 24, 2016, arXiv:1602.07674, 23 pages.
Flammia et al., "Direct Fidelity Estimation from Few Pauli Measurements," Phys. Rev. Lett., Jun. 8, 2011, 106(23):230501.
Fujii et al., "Commuting quantum circuits and complexity of Ising partition functions," New Journal of Physics, Mar. 2017, 19:033003.
Fujii et al., "Computational quantum-classical boundary of complex and noisy quantum systems," CoRR, Jun. 26, 2014, arXiv:1406.6932, 14 pages.
Fujii et al., "Impossibility of Classically Simulating One-Clean-Qubit Model with Multiplicative Error," Phys. Rev. Lett., May 2018, 120(20):200502.
Geraci et al., "Classical Ising model test for quantum circuits," New J. Phys., Jul. 28, 2010, 12:075026.
Gogolin et al., "Boson-Sampling in the light of sample complexity," CoRR, Jun. 17, 2013, arXiv:1306.3995, 22 pages.
Goldberg et al., "The complexity of approximating complex-valued Ising and Tutte partition functions," CoRR, Sep. 19, 2014, arxiv.org/abs/1409.5627.
Goldreich, "Computational complexity: a conceptual perspective," ACM SIGACT News, Sep. 1, 2008, 39(3):35-39.
Gorin et al., "Dynamics of Loschmidt echoes and fidelity decay," Phys. Rep., Nov. 2006, 435(2-3)33-156.

(56) References Cited

OTHER PUBLICATIONS

Gottesman, "The Heisenberg Representation of Quantum Computers," CoRR, Jul. 1, 1998, arXiv:quant-ph/9807006, 20 pages.
Haner et al., "High Performance Emulation of Quantum Circuits," CoRR, Apr. 21, 2016, arxiv:1604.06460, 9 pages.
Haner et al., "High Performance Emulation of Quantum Circuits," SC '16: Proceedings of the International Conference for High Performance Computing, Networking, Storage and Analysis, Nov. 13-18, 2016, 9 pages.
Harrow et al., "Random Quantum Circuits are Approximate 2-designs," Comm. Math. Phys., 2009, 291:257-302.
Hosur et al., "Chaos in quantum channels," Journal of High Energy Physics Volume, Feb. 2016, 2016(2):1-49.
International Preliminary Report on Patentability in International Appln. No. PCT/US2019/058775, mailed on Dec. 28, 2021, 9 pages.
International Search Report and Written Opinion in International Appln. No. PCT/US2019/058775, mailed on Apr. 15, 2020, 11 pages.
Isakov et al., "Understanding Quantum Tunneling through Quantum Monte Carlo Simulations," CoRR, Oct. 27, 2015, arXiv:1510.08057, 15 pages.
Jiang et al., "Scaling analysis and instantons for thermally-assisted tunneling and Quantum Monte Carlo simulations," CoRR, Mar. 3, 2016, arXiv:1603.01293, 15 pages.
Jozsa et al., "Classical simulation complexity of extended Clifford circuits," CoRR, May 2013, arxiv.org/abs/1305.6190, 17 pages.
Kalai et al., "Gaussian Noise Sensitivity and BosonSampling," CoRR, Sep. 10, 2014, arXiv:1409.3093, 24 pages.
Kelly et al., "State preservation by repetitive error detection in a superconducting quantum circuit," Nature, 2015, 519(7541):66-69.
Kim et al., "Ballistic Spreading of Entanglement in a Diffusive Nonintegrable System," Phys. Rev. Lett., Sep. 2013, 111(12):127205.
Knill et al., "Randomized benchmarking of quantum gates," Phys. Rev., Jan. 8, 2008, A77:012307.
Leverrier et al., "Analysis of circuit imperfections in BosonSampling," QIC, 2015, 15(5-6):4890512.
Lidar, "On the quantum computational complexity of the Ising spin glass partition function and of knot invariants," New J. Phys., Nov. 16, 2004, 6(167):16 pages.
Lloyd, "Pure state quantum statistical mechanics and black holes," CoRR, Jul. 1, 2013, arXiv:1307.0378, 15 pages.
Magesan et al., "Characterizing quantum gates via randomized benchmarking," Phys. Rev. A, Apr. 11, 2012, 85:042311.
Magesan et al., "Scalable and Robust Randomized Benchmarking of Quantum Processes," Phys. Rev. Lett., May 6, 2011, 106:180504.
Markov et al., "Simulating Quantum Computation by Contracting Tensor Networks," SIAM Journal On Computing, 2008, 38(3):21 pages.
Nahum et al., "Quantum Entanglement Growth Under Random Unitary Dynamics," CoRR, Aug. 24, 2016, arxiv.org/abs/1608.06950#, 27 pages.
Nakata et al., "Efficient unitary designs with nearly time-independent Hamiltonian dynamics," CoRR, Sep. 22, 2016, arXiv:1609.07021, 28 pages.
Notice of Acceptance for Patent Application in Australian Appln. No. 2019454278, dated Feb. 23, 2023, 3 pages.
Office Action in Australian Appln. No. 2019454278, dated Nov. 2, 2022, 4 pages.
Office Action in Candian Appln. No. 3143678, dated Jan. 16, 2023, 4 pages.
Oliveira et al., "Generic Entanglement Can Be Generated Efficiently," Phys. Rev. Lett., Mar. 30, 2007, 98:130502.
Peres, "Stability of quantum motion in chaotic and regular systems," Phys. Rev., Oct. 1984, 30(4):1610-1615.
Popescu et al., "Entanglement and the foundations of statistical mechanics," Nat. Phys., Nov. 2006, 2(11):754-758.
Porter et al., "Fluctuations of Nuclear Reaction Widths," Phys. Rev., Oct. 1956, 104:483-491.
Preskill, "Quantum computing and the entanglement frontier—Rapporteur talk at the 25th Solvay Conference," 25th Solvay Conf., Oct. 2011, 18 pages.
Rahimi-Keshari et al., "Sufficient Conditions for Efficient Classical Simulation of Quantum Optics," Phys. Rev., Jun. 20, 2016, X6:021039.
Renes, "Symmetric informationally complete quantum measurements," J. Math. Phys., May 6, 2004, 45:2171.
Schack et al., "Hypersensitivity to perturbations in the quantum baker's map," Phys. Rev. Lett., Jul. 1993, 71(525):8 pages.
Scott et al., "Hypersensitivity and chaos signatures in the quantum baker's maps," J. Phys. A: Math. Gen., Oct. 2006, 39(13405):32 pages.
Smelyanskiy et al., "qHIPSTER: The Quantum High Performance Software Testing Environment," CoRR, Jan. 26, 2016, arXiv:1601.07195, 9 pages.
Strohmaier et al., "The TOP500 List and Progress in High-Performance Computing," Computer, Nov. 2015, 48(11):42-49.
Terhal et al., "Adaptive Quantum Computation, Constant Depth Quantum Circuits and Arthur-Merlin Games," Quantum Information & Computation, Mar. 2004, pp. 134-145.
Trail et al., "Entanglement and the generation of random states in the quantum chaotic dynamics of kicked coupled tops," Phys. Rev. E, Oct. 2008, 78(046211):12 pages.
Trevisan, "Lecture Notes on Computational Complexity," Computer Science Division, U.C. Berkeley, Fall 2002, 171 pages.
Trieu, "Large-scale simulations of error prone quan-tum computation devices," Ph.D. Thesis, University of Wuppertal, 2010, 189 pages.
Trotzky et al., "Probing the relaxation towards equilibrium in an isolated strongly correlated one-dimensional Bose gas," Nat. Phys., 2012, 8:325-330.
Ududec et al., "Information-Theoretic Equilibration: The Appearance of Irreversibility under Complex Quantum Dynamics," Phys. Rev. Lett., Aug. 2013, 111:080403.
Villalonga et al., "Establishing the Quantum Supremacy Frontier with a 281 Pflop/s Simulation," Quantum Science and Technology, Apr. 2020, 5(034003):14 pages.
Walschaers et al., "Statistical benchmark for BosonSampling," New J. Phys., Mar. 3, 2016, 18:032001.
Weinstein et al., "Parameters of pseudorandom quantum circuits," Phys. Rev. A., Nov. 2008, A78(5):052332.
Notice of Allowance in Australian Appln. No. 2023203407, mailed on Jul. 31, 2024, 3 pages.
Office Action in Chinese Appln. No. 201980097969.6, mailed on Dec. 18, 2024, 10 pages (with English translation).
Office Action in Australian Appln. No. 2023203407, mailed on May 15, 2024, 3 pages.
Office Action in Canadian Appln. No. 3,143,678, mailed on May 16, 2024, 5 pages.

\* cited by examiner

ESTIMATING THE FIDELITY OF QUANTUM LOGIC GATES AND QUANTUM CIRCUITS

CROSS-REFERENCE TO RELATED APPLICATION

This application is a National Stage Application under 35 U.S.C. § 371 and claims the benefit of International Application No. PCT/US2019/058775, filed on Oct. 30, 2019, which claims priority to U.S. Provisional Application Ser. No. 62/868,525, filed on Jun. 28, 2019. The disclosures of the prior applications are considered part of and are incorporated by reference in the disclosure of this application.

BACKGROUND

This specification relates to quantum computing.

Quantum computing uses quantum-mechanical phenomena such as superposition and entanglement to perform computations. A quantum circuit is one example model for quantum computation in which a computation is a sequence of quantum logic gates, which are reversible transformations on a quantum mechanical analog of an n-bit register.

SUMMARY

This specification describes techniques for estimating the fidelity of quantum logic gates and quantum circuits.

In general, one innovative aspect of the subject matter described in this specification can be implemented in a method for estimating the fidelity of an n-qubit quantum logic gate, the method comprising: defining multiple sets of random quantum circuits, wherein the multiple sets of random quantum circuits correspond to different respective depths and each set in the multiple sets of random quantum circuits comprises random quantum circuits with a same circuit depth d, wherein defining the multiple sets of random quantum circuits comprises, for each set of random quantum circuits: defining one or more elements of the set of random quantum circuits, comprising, for each element: randomly sampling d*n single qubit gates from a predefined set of single qubit gates, wherein each single qubit gate operates on a respective qubit at a respective cycle; and defining the element of the set of random quantum circuits as equal to d cycles of n randomly sampled single qubit gates followed by the n-qubit quantum logic gate; for each set of random quantum circuits: selecting an observable for each element in the set of random quantum circuits, wherein each selected observable corresponds to a respective element of the set of random quantum circuits and is dependent on the element to which it corresponds; and estimating a value of a polarization parameter for the set of random quantum circuits, comprising performing a least mean squares minimization based on multiple expectation values, wherein each expectation value comprises an expectation value of a respective selected observable with respect to an output of an experimental implementation of a random quantum circuit corresponding to the respective selected observable; and processing the estimated polarization parameter values to obtain an estimate of the fidelity of the n-qubit quantum logic gate.

Other implementations of this aspect include corresponding classical and quantum computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations estimating a value of a polarization parameter for the set of random quantum circuits further comprises determining the multiple expectation values, comprising, for each expectation value: defining the expectation value of the respective selected observable with respect to an output of an experimental implementation of a random quantum circuit corresponding to the respective selected observable as i) a trace of the respective selected observable divided by the size of Hilbert space, added to ii) a polarization of the random quantum circuit multiplied by a difference between an expectation value of the respective selected observable with respect to an ideal output state of the random quantum circuit and the trace of the respective selected observable divided by the size of Hilbert space; estimating values of i) the expectation value of the respective selected observable with respect to an ideal output state of the random quantum circuit, and ii) the trace of the respective selected observable divided by the size of Hilbert space, numerically; and estimating a value of the expectation value of the respective selected observable with respect to an output of an experimental implementation of the random quantum circuit experimentally.

In some implementations estimating a value of the expectation value of the respective selected observable with respect to an output of an experimental implementation of the random quantum circuit experimentally comprises: repeatedly: preparing a quantum system in an initial state; applying the random quantum circuit to the quantum system prepared in the initial state to generate an evolved state of the quantum system; and measuring the respective selected observable with respect to the evolved state of the quantum system; and averaging the measured selected observables to estimate the value of the expectation value of the respective selected observable with respect to an output of an experimental implementation of the random quantum circuit.

In some implementations performing the least squares minimization comprises: minimizing a sum of squared residuals, each squared residual corresponding to a respective element in the set of random quantum circuits, and each squared residual comprising a square of i) a trace of the respective selected observable divided by the size of Hilbert space, added to ii) the value of the polarization parameter for the set of the random quantum circuits multiplied by a difference between an expectation value of the respective selected observable with respect to an ideal output state of the random quantum circuit and the trace of the respective selected observable divided by the size of Hilbert space, minus iii) the expectation value of the respective selected observable with respect to an output of an experimental implementation of the random quantum circuit corresponding to the respective selected observable.

In some implementations processing the estimated polarization parameter values to obtain an estimate of the fidelity of the n-qubit quantum logic gate comprises: fitting the estimated polarization parameter values corresponding to each circuit depth d as an exponential decay in d; determining an estimated polarization per cycle $p_n$ for the n-qubit quantum logic gate based on the exponential decay in d and an obtained estimate of polarization for a single qubit gate in a quantum circuit that operates on n qubits; and determining an estimate of the fidelity of the n-qubit quantum logic gate using $F=p_n+(1-p_n)/D$, where $D=2^n$ represents the Hilbert space dimension.

In some implementations the n-qubit quantum logic gate operates on at most 5 qubits.

In some implementations the selected observables are diagonal in the computational basis.

In some implementations the selected observables comprises a cross entropy benchmarking observable, a linear cross entropy observable, or a heavy output generation score observable.

In some implementations the method further comprises determining one or more properties of quantum hardware implementing the n-qubit quantum logic gate using the estimate of the fidelity of the n-qubit quantum logic gate.

In some implementations the method further comprises determining one or more adjustments to quantum hardware control parameters based on the determined estimate of the fidelity; and implementing the determined one or more adjustments to perform quantum computations using quantum computing hardware.

In some implementations the method further comprises calculating a distribution of a random variable associated with the selected observables; and performing one or more statistical tests using the calculated distribution of the random variable to obtain additional information about the n-qubit quantum logic gate.

In some implementations performing one or more statistical tests using the calculated distribution of the random variable to obtain additional information about the n-qubit quantum logic gate comprises performing a Kolmogorov-Smirnov test to validate the estimated fidelity of the n-qubit quantum logic gate.

In general, another innovative aspect of the subject matter described in this specification can be implemented in a method for estimating the fidelity of a quantum circuit, the method comprising: defining one or more random quantum circuits, wherein each of the one or more random quantum circuits has a same circuit depth d and operates on a same number of qubits n, wherein defining a random quantum circuit comprises: randomly sampling d*n single qubit gates from a predefined set of single qubit gates, wherein each single qubit gate operates on a respective qubit; and defining the random quantum circuit as equal to d cycles of n randomly sampled single qubit gates followed by multiple multi-qubit quantum logic gates acting on different qubits; selecting, for each defined random quantum circuit, an observable for the random quantum circuit, wherein i) the selected observable is dependent on the random quantum circuit, and ii) an expectation value of the selected observable with respect to a density matrix representing an effect of errors in an experimental implementation of the random quantum circuit obeys a concentration of measure about an expectation value of the selected observable; and determining, for each defined random quantum circuit, an estimate of the fidelity of the random quantum circuit, comprising, for each random quantum circuit, estimating an expectation value of the respective selected observable with respect to an output of an experimental implementation of the random quantum circuit.

Other implementations of this aspect include corresponding classical and quantum computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations estimating an expectation value of the selected observable with respect to an output of an experimental implementation of a random quantum circuit comprises: approximating the expectation value of the selected observable with respect to an output of an experimental implementation of the random quantum circuit as a sum of a trace of the selected observable divided by Hilbert space size added to the fidelity of the quantum circuit multiplied by a difference between i) an expectation value of the selected observable with respect to an ideal output state of the quantum circuit and the a trace of the selected observable divided by Hilbert space size; estimating a value of the expectation value of the selected observable with respect to an output of an experimental implementation of the random quantum circuit experimentally; estimating values of i) the expectation value of the selected observable with respect to an ideal output state of the random quantum circuit, and ii) the trace of the respective selected observable, numerically or analytically.

In some implementations estimating a value of the expectation value of the selected observable with respect to an output of an experimental implementation of the random quantum circuit experimentally comprises: repeatedly: preparing a quantum system in an initial state; applying the random quantum circuit to the quantum system prepared in the initial state to generate an evolved state of the quantum system; and measuring the respective selected observable with respect to the evolved state of the quantum system; and averaging the measured selected observables to estimate the value of the expectation value of the selected observable with respect to an output of an experimental implementation of the random quantum circuit.

In some implementations the method comprises analytically estimating values of i) the expectation value of the selected observable with respect to an ideal output state of the random quantum circuit, and ii) the trace of the respective selected observable, and wherein the output of the experimental implementation of the random quantum circuit is approximated by a Porter-Thomas distribution.

In some implementations the method further comprises determining an average of the determined estimates of fidelity for each random quantum circuit to obtain an average estimate of circuit fidelity at the circuit depth d and number of qubits n.

In some implementations the quantum circuit operates on 10 or more qubits.

In some implementations the selected observables are diagonal in the computational basis.

In some implementations the selected observables comprises a cross entropy benchmarking observable, a linear cross entropy observable, or a heavy output generation score observable.

In some implementations the method further comprises determining one or more properties of quantum hardware implementing the quantum circuit using the determined estimates of the fidelity or the average estimate of circuit fidelity.

In some implementations the method further comprises determining one or more adjustments to quantum hardware control parameters based on the determined estimates of fidelity; and implementing the determined one or more adjustments to perform quantum computations using quantum computing hardware.

In some implementations the method further comprises calculating a distribution of a random variable associated with the selected observables; and performing one or more statistical tests using the calculated distribution of the random variable to obtain additional information about the quantum circuit.

In some implementations performing one or more statistical tests using the calculated distribution of the random variable to obtain additional information about the quantum circuit comprises performing a Kolmogorov-Smirnov test to validate the estimated fidelity of the quantum circuit.

The subject matter described in this specification can be implemented in particular ways so as to realize one or more of the following advantages.

The presently described techniques for estimating the fidelity of a quantum circuit can be applied to a wider range of quantum circuits and numbers of qubits compared to known techniques. For example, the presently described techniques do not have to assume that the quantum circuits approximate the Porter-Thomas distribution. In addition, the presently described techniques are not restricted to particular observables, e.g., cross entropy observables, but can be applied in conjunction with different observables that can provide more accurate estimates of fidelity for a particular quantum circuit. In addition, the presently described techniques are applicable to any quantum logic gates and is not restricted to Clifford gates. In addition, the presently described techniques provide increased scalability, e.g., to 40 qubits or beyond.

The presently described techniques can be applied to improve quantum computing hardware. For example, circuit fidelities can be used to calibrate or validate quantum computing hardware, or to determine adjustments that may improve the accuracy or efficiency of existing quantum computing hardware. Since circuit fidelities estimated using the techniques described in this specification can be more accurate and more tailored to a particular quantum circuit and/or quantum computing hardware, adjustments determined using the estimated circuit fidelities may be more effective. In addition, high fidelity gates are critical for quantum computers. High fidelity gates require high precision control, and the presently described techniques can be used to improve the precision of the control. In addition, high fidelity gates are critical for quantum computers. High fidelity gates require high precision control, and the presently described techniques can be used to improve the precision of the control.

Details of one or more implementations of the subject matter of this specification are set forth in the accompanying drawings and the description below. Other features, aspects, and advantages of the subject matter will become apparent from the description, the drawings, and the claims.

DETAILED DESCRIPTION

Overview

A quantum circuit is a model for quantum computation in which quantum logic gates are applied in a specific sequence to a register of qubits to encode quantum information. In theory, any quantum algorithm can be implemented with high precision by applying a correctly chosen sequence of quantum logic gates. However, in practice quantum logic gates are error prone—instead of implementing a unitary quantum operation representing an ideal quantum logic gate, a corresponding noisy quantum operation is implemented.

Quantum logic gate fidelity is a measure of how close a noisy quantum operation $\varepsilon$ is to an ideal unitary quantum operation $\mathcal{U}$. The quantum logic gate fidelity between $\varepsilon$ and $\mathcal{U}$ for a given quantum state $\rho$ may be given by $$\mathcal{F}_{Ent}(\rho) = \left( tr \left( \sqrt{ \sqrt{\varepsilon(\rho)} \, \mathcal{U}(\rho) \sqrt{\varepsilon(\rho)} } \right) \right)^2.$$

Estimating quantum logic gate fidelity is an important procedure for adjusting or correcting quantum hardware that physically realizes quantum logic gates and, in turn, is an important procedure for performing successful quantum computations. This specification describes generalized techniques for obtaining statistical fidelity estimators that do not necessarily assume a Porter-Thomas distribution and do not constrain to one type of observable.

Example Hardware

Figure 1:
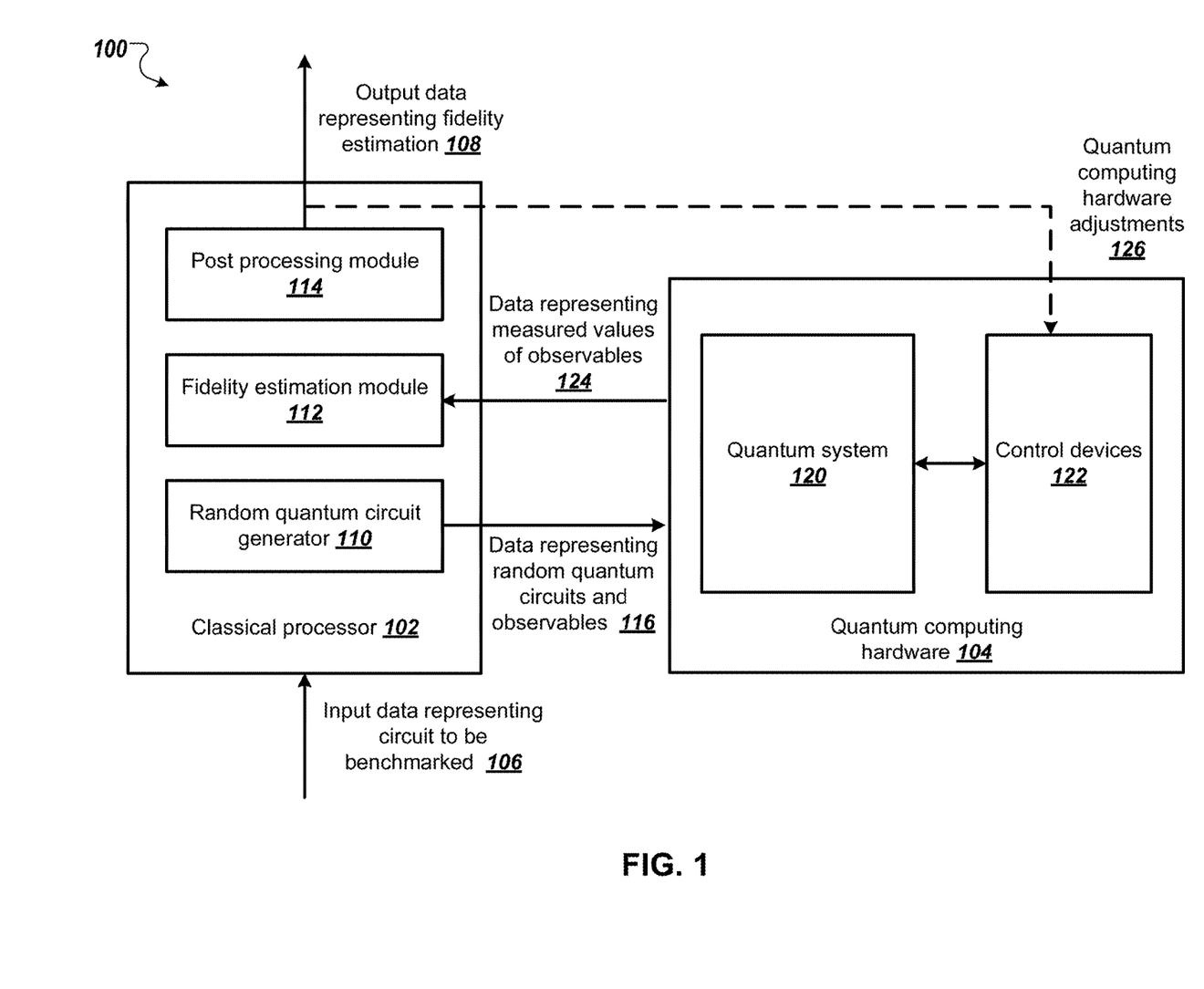
FIG. 1 depicts an example system for benchmarking quantum computing hardware.

FIG. 1 depicts an example system 100 for benchmarking quantum computing hardware. The example system 100 is an example of a system implemented as classical and quantum computer programs on one or more classical and quantum computers in one or more locations, in which the systems, components, and techniques described below can be implemented.

The system 100 includes a classical processor 102 in data communication with quantum computing hardware 104. For convenience, the classical processor 102 and quantum computing hardware 104 are illustrated as separate entities. However, in some implementations the classical processor 102 can be included in quantum computing hardware 104, e.g., the quantum computing hardware 104 can include one or more components for performing classical computing operations.

The quantum computing hardware 104 includes components for performing quantum computations using quantum circuits. For example, the quantum computing hardware 104 includes a quantum system 120 and control devices 122. The quantum system 120 includes one or more multi-level quantum subsystems, e.g., qubits, that are used to perform algorithmic operations or quantum computations. The specific realization of the multi-level quantum subsystems that the quantum computing hardware 104 includes and how they interact with one another is dependent on a variety of factors including the type of quantum computations that the quantum computing hardware is performing. For example, the multi-level quantum subsystems may include qubits that are realized via atomic, molecular or solid-state quantum systems. In other examples the qubits may include, but are not limited to, superconducting qubits or semi-conducting qubits.

The multi-level quantum subsystems can be frequency tunable. For example, each qubit may have associated operating frequencies that can be adjusted, e.g., using one or more control devices 122, through application of voltage pulses via one or more drivelines coupled to the qubit. Example operating frequencies include qubit idling frequencies, qubit interaction frequencies, and qubit readout frequencies. Different frequencies correspond to different operations that the qubit can perform. For example, setting the operating frequency to a corresponding idling frequency may put the qubit into a state where it does not strongly interact with other qubits, and where it may be used to perform single-qubit gates. As another example, in cases where qubits interact via couplers with fixed coupling, qubits can be configured to interact with one another by setting their respective operating frequencies at some gate-dependent frequency detuning from their common interaction frequency. In other cases, e.g., when the qubits interact via tunable couplers, qubits can be configured to interact with one another by setting the parameters of their respective couplers to enable interactions between the qubits and then by setting the qubit's respective operating frequencies at some gate-dependent frequency detuning from their common interaction frequency. Such interactions may be performed in order to perform two-qubit or many-qubit gates.

The control devices 122 can further include measurement devices, e.g., readout resonators. Measurement results obtained via measurement devices may be provided to classical processors included in the quantum computing hardware 104 or to the classical processor 102 for processing and analyzing.

The classical processor 102 receives as input data 106 representing a quantum logic gate or quantum circuit to be benchmarked. For example, the input data 106 may include data representing an n-qubit quantum logic gate that the quantum computing hardware 104 is configured to implement. The input data 106 may also specify a type of observable to use when benchmarking the quantum logic gate or quantum circuit. Example observables are described in detail below with reference to FIGS. 2 and 3.

The classical processor 102 processes the received input data 106 to generate as output data 108 representing benchmarking results, e.g., properties of implementations of the quantum logic gate or quantum circuit. For example, the output data 108 may include data representing an estimated fidelity of an implementation of the n-qubit quantum logic gate.

The classical processor 102 includes multiple components for processing received input data. For example, the classical processor 102 can include a random quantum circuit generator 110, fidelity estimation module 112, and a post processing module 114.

The random quantum circuit generator 110 can be configured to define multiple random quantum circuits. The multiple random quantum circuits can include sets of random quantum circuits that correspond to different respective circuit depths and that include random quantum circuits with a same circuit depth d.

To define a random quantum circuit of depth d, the random quantum circuit generator 110 is configured to randomly sample single qubit gates from a predefined set of single qubit gates, e.g., a set of single qubit gates that can be implemented by quantum hardware 120. For example, the predefined set of single qubit gates may include quantum gates representing $\pi/2$ rotations around the axes located in the (x, y) plane whose orientations are sampled uniformly at random, and d phase quantum gates representing a non-Clifford diagonal matrix $\{0, e^{if}\}$ with f randomly sampled from the interval $(0, 2\pi)$. Other sets of single qubit gates can also be used, as long as they are sufficiently random such that the depolarizing channel model can be used to model the effect of noise in the defined random quantum circuits.

The random quantum circuit generator 110 then defines a random quantum circuit as being equal to d cycles of randomly sampled single qubit gates followed by the quantum logic gate or circuit that is being benchmarked, e.g., each cycle includes respective randomly sampled single qubit gates followed by the quantum logic gate that is being benchmarked. The classical processor 102 can also define an observable corresponding to each defined random quantum circuit, e.g., based on the type of observable specified by the input data 106.

The classical processor 102 can be configured to transmit data 116 representing defined random quantum circuits and observables to the quantum computing hardware 104. The quantum computing hardware 104 is configured to implement defined random quantum circuits on the quantum system 120 using the control devices 122, as described above, and provide as output data representing results of the circuit implementations, e.g., data 124 representing measured values of the observables.

The fidelity estimation module 112 can be configured to estimate a value of a fidelity parameter for the random quantum circuits generated by the random quantum circuit generator 110 and implemented by the quantum computing hardware 104. For example, the fidelity estimation module 112 can be configured to perform the numerical simulations, least mean squares minimization routines, and other classical computations described below with reference to FIGS. 2-4.

The post processing module 114 can be configured to process estimated fidelity parameter values generated by the fidelity estimation module 112 based on random quantum circuits generated by the random quantum circuit generator 110 to obtain an estimate of a fidelity of a specific component of the random quantum circuits, e.g., a specific quantum logic gate specified by the input data 106. The post processing module 114 may generate as output data representing a fidelity estimation of the component of the random quantum circuits, e.g., output data 108.

In addition, in some implementations the post processing module 114 can be configured to process or analyze estimated fidelity parameter values to determine properties of the quantum computing hardware 104, e.g., its performance, or to calibrate, validate or benchmark the quantum computing hardware 104. The post processing module 114 can also be configured to perform additional statistical tests to obtain additional information about the quantum computing hardware, e.g., the variance of quantum circuit fidelity. An example process for performing additional statistical tests to obtain such information is described below with reference to FIG. 4.

In some implementations the post processing module 114 may further generate as output data representing one or more adjustments 126 that may be used to adjust and improve the quantum computing hardware 104. For example, the post processing module 114 may use the estimated fidelity parameter values to determine adjustments to how the quantum computing hardware is controlled when implementing a particular quantum circuit or type of quantum circuits, e.g., determine modifications to the programming of the control devices 122 to achieve higher fidelity quantum gates. A parametrized control model may be used to determine the modifications, where the parameterized control model relates parameters of the quantum gates (e.g. phases, qubit rotation angles etc.) to physical parameters of the system/systems used to implement/control the quantum gate (e.g. voltages, pulse shapes, frequencies etc.) An outer loop may then be performed to find optimal experimental controls to improve the performance of the quantum computing hardware 104.

Programming the Hardware

Figure 2:
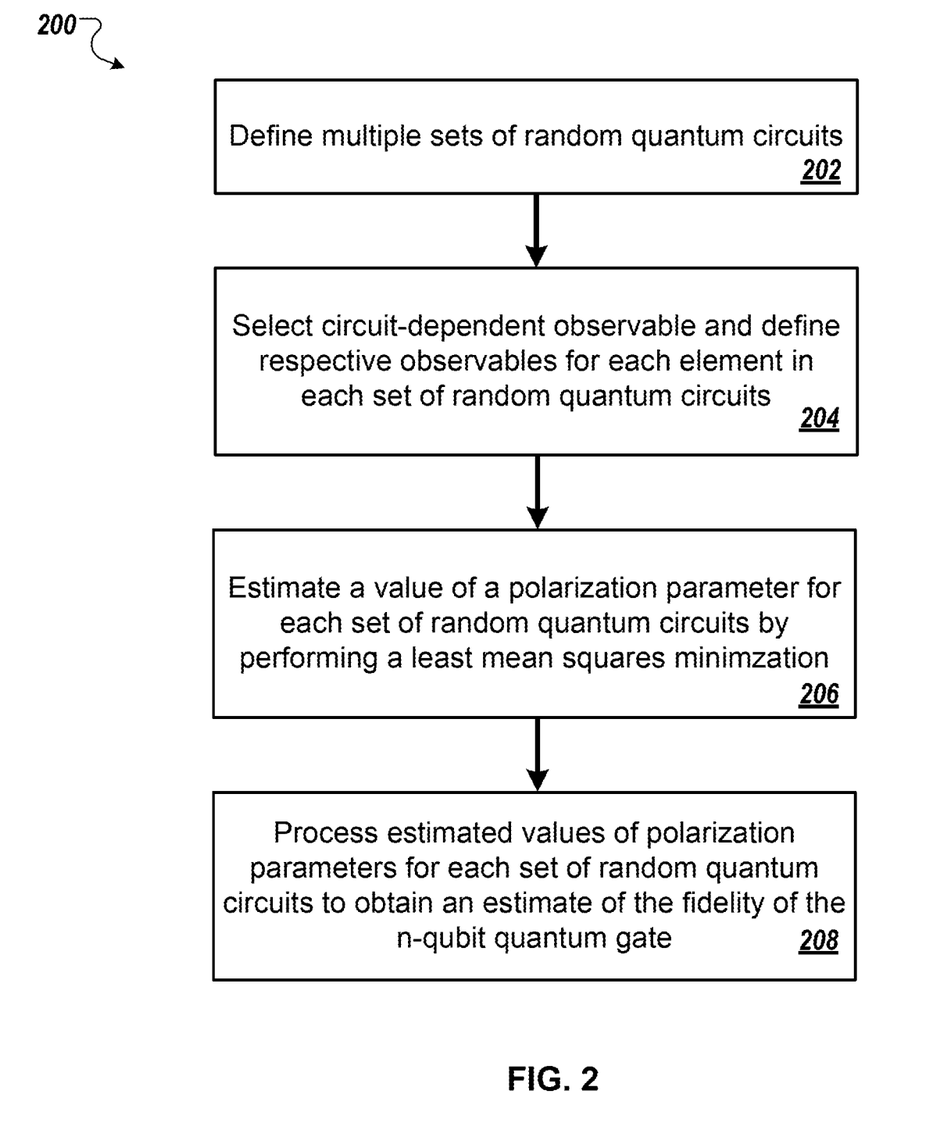
FIG. 2 is a flow diagram of a first example process for estimating the fidelity of a quantum logic gate.

FIG. 2 is a flow diagram of a first example process 200 for estimating the fidelity of a n-qubit quantum logic gate $G_n$. Example process 200 can be applied to determine the fidelity of a quantum logic gate $G_n$ that operates on an arbitrary number of qubits, e.g., for any n≥1, however it is particularly suitable for estimating the fidelity of quantum logic gates $G_n$ that operate on a small number of qubits, e.g., n<5. For convenience, the process 200 will be described as being performed by a system of one or more classical and quantum computing devices located in one or more locations. For example, the system 100 of FIG. 1, appropriately programmed in accordance with this specification, can perform the process 200.

Operating a single multi-qubit gate in isolation is different from operating it in the context of a complex algorithm on a large device, since non-idealities such as crosstalk and unwanted interactions affect the implementations of the multi-qubit gate. Therefore, to estimate the fidelity of the quantum logic gate $G_n$, the gate is embedded into quantum circuits that include multiple quantum logic gates. The fidelity of each of the quantum circuits is then estimated, and the fidelity of the individual gate $G_n$ can be extracted from the estimated circuit fidelities.

The quantum circuits that the gate $G_n$ is embedded into take the same form: each quantum circuit includes one or more single-qubit gates chosen from a random set and the quantum logic gate $G_n$. For example, the quantum circuits may each include one or more cycles of n randomly sampled single qubit gates, e.g., one per qubit, followed by the quantum logic gate $G_n$. The depth of the quantum circuit is equal to the number of cycles. For example, a quantum circuit with depth d=2 may include two cycles, where each cycle includes n randomly sampled single qubit gates that each operate on a respective qubit followed by the quantum logic gate $G_n$. Due to the random sampling of single qubit gates, a quantum circuit of this form is herein referred to as a random quantum circuit.

The system defines multiple sets of random quantum circuits (step 202). The multiple sets of random quantum circuits correspond to different respective depths and each set in the multiple sets of random quantum circuits comprises random quantum circuits with a same circuit depth d. To define a set of random quantum circuits with circuit depth d, the system defines elements of the set of random quantum circuits, i.e., random quantum circuits to be included in the set. Defining an element of a set of random quantum circuits with circuit depth d includes randomly sampling d*n single qubit gates from a predefined set of single qubit gates, wherein each single qubit gate operates on a respective qubit of the n qubits, and defining the element of the set of random quantum circuits as equal to d cycles of n randomly sampled single qubit gates followed by the n-qubit quantum logic gate.

The effect of noise in a random quantum circuit with depth d=1 can be represented by the depolarizing channel given below in Equation (1).

$$\Lambda_p(\rho) = p\rho + (1-p)\frac{\mathbb{1}}{2^n} \quad (1)$$

In Equation (1), ρ represents the state of the n qubits, $\mathbb{1}$ represents an identity matrix, and p represents the random circuit polarization and includes the fidelities from the quantum logic gate $G_n$ and the single qubit gates included in the random circuit. The system estimates the parameter p using data taken from multiple sets of random circuits. Each set includes random circuits with a same circuit depth d, and the multiple sets of random circuits correspond to different respective depths, e.g., approximately 100 different depths between 10 and 700.

The effect of noise in an instance of a random circuit with depth d>1 and parameter p (corresponding to a random circuit with depth d=1) can be represented by the depolarizing channel given below in Equation (2).

$$\Lambda_p(\rho) = p^d\rho + (1-p^d)\frac{\mathbb{1}}{2^n} \quad (2)$$

In Equation (2), ρ represents the state of the n qubits and $p^d$ represents the random circuit. The system estimates the parameter $p^d$ from a set of experimental realizations of random circuits of depth d, as described in more detail below with reference to step 206.

The system selects an observable O (step 204). The selected observable is an observable that depends on a particular instance of a random quantum circuit U, that is, $O=O_U$. In some implementations the selected observable $O_U$ can be chosen to be diagonal in the computational basis, e.g., to simplify obtaining an experimental estimation of an expectation value of the observable $O_U$ with respect to the output of an experimental noisy implementation of the random circuit.

For example, in some implementations the system may select a linear cross entropy observable. The linear cross entropy observable is given by Equation (3) below.

$$O_U^L = \sum_z N p_U(z) |z\rangle\langle z| \quad (3)$$

In Equation (3), $N=2^n$, $p_U(z)$ represents a probability that circuit U outputs a particular bit string z and $|z\rangle$ represents an output state corresponding to the particular bit string z.

As another example, in some implementations the system may select a heavy output generation score observable. The heavy output generation score observable is given by Equation (4) below.

$$O_U^H = \sum_z 1_{Np_U(z) \geq \log 2} |z\rangle\langle z| \quad (4)$$

In Equation (4), $1_{Np_U(z) \geq \log 2}$ is equal to 1 if $Np_U(z) \geq \log 2$ and is otherwise equal to 0, and $|z\rangle$ represents an output state corresponding to the particular bit string z.

Since the selected observable depends on a particular instance of a random quantum circuit (e.g., a respective random sampling of single qubit gates and circuit depth), the system defines a respective observable for each element in each set of random quantum circuits.

The expectation value of an observable $O_U$ with respect to the output $\rho_U$ of an experimental noisy implementation of the random quantum circuit U can be given by Equation (5) below.

$$Tr\rho_U O_U = R_U \qquad (5)$$
$$= p^d \langle \psi | O_U | \psi_U \rangle + (1 - p^d) Tr O_U / 2^N$$
$$= p^d (V_U - N_U) + N_U$$

In Equation (5), $|\psi_U\rangle$ represents the state of the qubits after the random quantum circuit U is applied to an initial state of qubits, e.g., $|\psi_U\rangle = U|\psi_0\rangle$, $V_U = \langle \psi_U | O_U | \psi_U \rangle$, $R_U = Tr\rho_U O_U$, and $N_U = Tr O_U / 2^n$.

The system estimates a value of the polarization parameter $p^d$ for each set of random quantum circuits (e.g., for each depth d) (step 206). The system estimates a value of the polarization parameter $p^d$ for a respective set of random quantum circuits by performing a least mean squares minimization based on Equation (5). First, the system determines values of $V_U$, $N_U$ and $R_U$ in Equation (5) for respective random quantum circuits U in the set of random quantum circuits. The system can determine values of $V_U$ and $N_U$ numerically, e.g., via $V_U = \Sigma_z p_U(z) \langle z | O_U | z \rangle$ and $N_U = \Sigma_z (z|O_U|z)/N$, and a value for $R_U$ experimentally.

The system can estimate $R_U = \alpha(V_U - N_U) + N_U$ in Equation (5) experimentally by performing multiple measurements of the selected observable $O_U$ to determine an estimate $\hat{R}_U$. This can include repeatedly preparing a quantum system (register of qubits) in an initial state, applying the random circuit U to the quantum system prepared in the initial state to generate an evolved state of the quantum system, and measuring the observable with respect to the evolved state of the quantum system to obtain multiple measurement results that can be used to determine the estimate $\hat{R}_U$, e.g., through averaging of the multiple measurement results.

For example, the action of a selected observable $O_U = \Sigma_z O_U(z) |z\rangle\langle z|$ maps each bit string or measurement outcome z to a real value $O_U(z)$. Each value $O_U(z)$ depends on the random circuit U, and the calculation of experimental values $\{O_U(z_j)\}$ requires classical simulations of U, e.g., for a linear cross entropy observable $Np_U(z)$ where $p_U(z) = |\langle z|U|O\rangle|^2$ if the initial state is $|O\rangle$, calculating the value $p_U(z_j) = |\langle z_j|U|O\rangle|^2$ for a specific bit string $z_j$ measured in an experiment requires a simulation of U. For a set of M measurement results $\{z_j\}$ the estimate $\hat{R}_U$ of $R_U$ can be given by Equation (6) below, $$\hat{R}_U = \frac{1}{M} \sum_{z_j} O_U(z_j) \qquad (6)$$

which in turn gives Equation (7) below.

$$R_U = \hat{R}_U + O\left(\frac{1}{\sqrt{M}}\right) \qquad (7)$$

To obtain an estimate of the polarization parameter $p^d$ for a respective set of random quantum circuits, the system performs the least mean squares minimization by minimizing a sum (over random circuits) of squared residuals, wherein each residual is given by setting Equation (5) equal to zero, i.e., each residual is given by $p^d(V_U - N_U) - (\hat{R}_U - N_U)$ (in words, each residual is given by i) the polarization parameter $p^d$ for the respective set of random quantum circuits multiplied by the difference between $V_U$ (the expectation value of the respective selected observable with respect to an ideal output state of the random quantum circuit) and $N_U$ (the trace of the respective selected observable divided by the size of Hilbert space), and ii) the difference between $\hat{R}_U$ (the estimated expectation value of an observable $O_U$ with respect to the output $\rho_U$ of an experimental noisy implementation of the random quantum circuit) and $N_U$ (the trace of the respective selected observable divided by the size of Hilbert space)). That is, the system determines a minimum of $$LMS(p^d) = \frac{1}{2} \sum_{\{U\}} \left( p^d (V_U - N_U) - (\hat{R}_U - N_U) \right)^2$$
$$= \frac{1}{2} \sum_{\{U\}} \left( p^d \Delta V_U - \Delta \hat{R}_U \right)^2$$

where $\Delta V_U = V_U - N_U$ and $\Delta \hat{R}_U = \hat{R}_U - N_U$. The minimum of $LMS(p^d)$ is then obtained using $$\frac{\partial LMS(p^d)}{\partial p^d} = \frac{1}{2} \sum_{\{U\}} \frac{\partial}{\partial p^d} \left( p^d \Delta V_U - \Delta \hat{R}_U \right)^2$$
$$= \sum_{\{U\}} \left( p^d \Delta V_U - \Delta \hat{R}_U \right) \Delta V_U$$
$$= p^d \sum_{\{U\}} \Delta V_U^2 - \sum_{\{U\}} \Delta \hat{R}_U \Delta V_U$$

That is, the system obtains the polarization $p^d$ as $$p^d = \frac{\sum_U \Delta \hat{R}_U \Delta V_U}{\sum_U \Delta V_U^2}. \qquad (8)$$

where $\Delta V_U = V_U - N_U$ and $\Delta \hat{R}_U = R_U - N_U$

The system processes the estimated polarization parameter values $p^d$ to obtain an estimate of the value of the polarization parameter p of Equation (1) (step 208). For example, the system can fit the estimates $p^d$ for different depths d as an exponential decay in d and extrapolate to obtain an estimate of p for d=1. Fitting the estimates this way distinguishes the polarization parameter p for the single application of the quantum circuit from state preparation and measurement errors (SPAM). More explicitly, SPAM errors can be modeled as a constant depolarizing fidelity S, independent of d, and fitting the exponential decay of $Sp^d$ as a function of d enables the system to fit p independently of the SPAM errors.

The system can use the estimate of p for d=1 (the polarization per cycle) to determine the fidelity of the individual gate $G_n$. For example, the system can obtain an estimate of the polarization $p_{1,n}$ for a single qubit gate in a circuit with n qubits from previous randomized benchmarking or cross-entropy benchmarking experiments. The system can then estimate a polarization per cycle $p_n$ for the gate $G_n$ as $p/p_{1,n}{}^n$. This polarization per cycle $p_n$ can be converted into a measure of fidelity for the gate $G_n$ using $F=p_n+(1-p_n)/D$, where $D=2^n$ represents the Hilbert space dimension.

In some implementations the system may further perform statistical tests to gather more information about the random circuit or the estimate of the fidelity parameter, as described in more detail below with reference to FIG. 4.

In some implementations the system may further determine one or more properties of the random circuit using the estimate of the fidelity parameter p and/or additional information about the quantum circuit obtained using the example process 400 described below with reference to FIG. 4. For example, the estimated value of the polarization parameter p or the corresponding fidelity may be used to determine the performance of the random circuit. As another example, the estimated fidelity may be used to (i) calibrate, (ii) validate, or (iii) benchmark quantum computing hardware implementing the quantum circuit.

In some implementations the system can determine one or more adjustments to quantum computing hardware using the estimate of the fidelity and/or additional information about the quantum circuit. For example, the system can determine adjustments to control parameters of a control model used by the quantum computing hardware to implement quantum operations to improve the fidelity of the quantum operations. The system can use the adjusted control model to implement the quantum operations with increased fidelity in future quantum computations.

Figure 3:
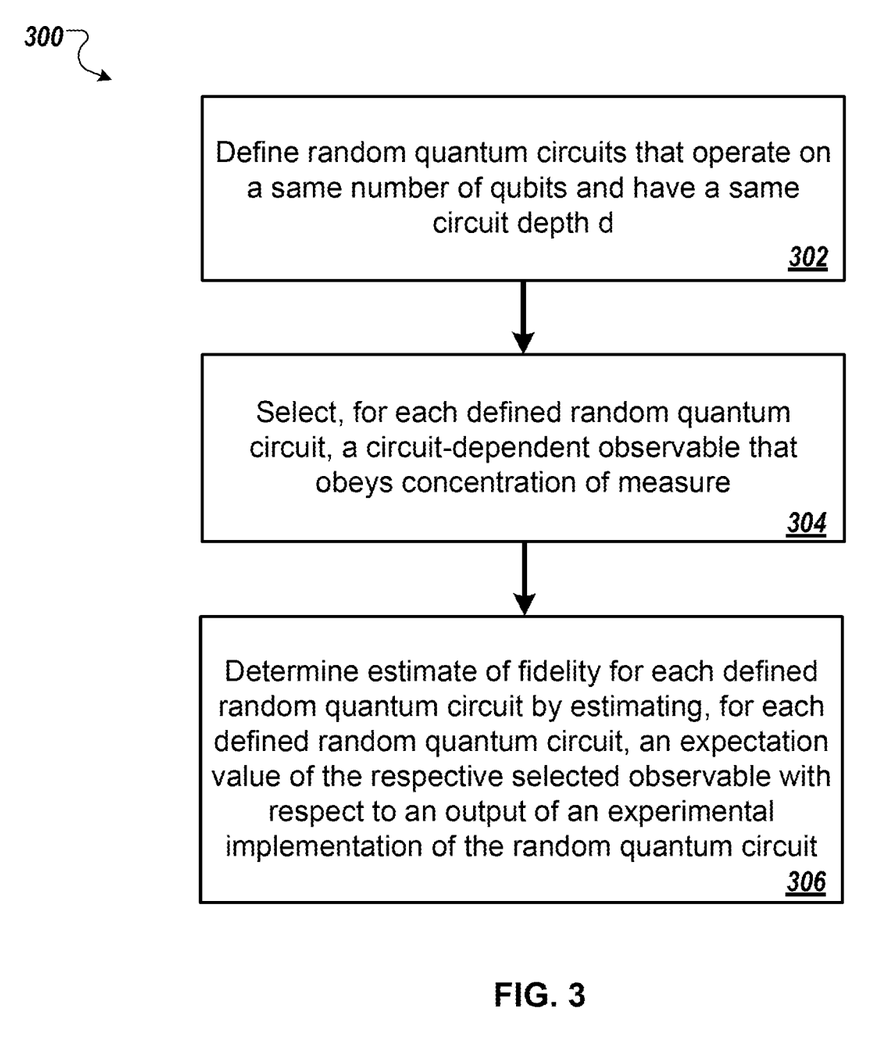
FIG. 3 is a flow diagram of a second example process for estimating the fidelity of a quantum circuit.

FIG. 3 is a flow diagram of a second example process 300 for estimating the fidelity of a n-qubit quantum circuit. Example process 300 can be applied to estimate the fidelity of a quantum circuit that operates on an arbitrary number of qubits, e.g., for any $n \geq 1$, however it is particularly suitable for estimating the fidelity of quantum circuits that operate on a large number of qubits, e.g., $n \geq 10$. For convenience, the process 300 will be described as being performed by a system of one or more classical and/or quantum computing devices located in one or more locations. For example, the system 100 of FIG. 1, appropriately programmed in accordance with this specification, can perform the process 300.

The system defines multiple quantum circuits (step 302). The defined quantum circuits have a same circuit depth d and operate on a same number of qubits n. Each defined quantum circuit includes one or more single-qubit gates chosen from a sufficiently random set and multiple multi-qubit quantum gates, e.g., multiple instances of a two qubit gate. For example, each of the quantum circuits may include d cycles of n randomly sampled single qubit gates, e.g., one per qubit, followed by multiple multi-qubit quantum logic gates acting on different qubits. For example, a quantum circuit with depth d=2 may include two cycles of n randomly sampled single qubit gates that each operate on a respective qubit followed by a multi qubit quantum gate. Due to the random sampling of single qubit gates, a quantum circuit of this form is herein referred to as a random circuit.

An output of an experimental (noisy) implementation of a random quantum circuit U defined at step 302 can be given by Equation (9) below.

$$\rho_U = \alpha |\psi_U\rangle\langle\psi_U| + (1-\alpha)\chi_U \quad (9)$$

In Equation (9), $|\psi_U\rangle$ represents the state of the quantum system (register of qubits) after application of the random quantum circuit, $\alpha = \langle\psi_U|\rho_U|\psi_U\rangle$ represents the random quantum circuit fidelity, and $\chi_U$ represents a density matrix representing an effect of errors in the experimental implementation of the random quantum circuit. In some implementations the output of the implementation of the random quantum circuit U may approximate a Haar random state or a Porter-Thomas distribution. For completeness it is noted that there is a small difference, of order $2^{-n}$ between the fidelity $\alpha$ and the parameter p of Equation (1) above, which can be ignored for $n \gg 1$.

The system selects an observable O (step 304). The selected observable is an observable that depends on a particular instance of a random quantum circuit U, that is, $O=O_U$. In some implementations the selected observable $O_U$ can be chosen to be diagonal in the computational basis, e.g., to simplify obtaining an experimental estimation of an expectation value of the observable $O_U$ with respect to the output of an experimental noisy implementation of the random circuit.

For example, in some implementations the system may select a linear cross entropy observable for the simulation of the quantum circuit. The linear cross entropy observable is given by:

$$O_U^L = \sum_z N p_U(z) |z\rangle\langle z| \quad (10)$$

where $N=2^n$, $p_U(z)$ represents a probability that circuit U outputs a particular bit string z and $|z\rangle$ represents an output state corresponding to the particular bit string z.

As another example, in some implementations the system may select a heavy output generation score observable for the simulation of the quantum circuit. The heavy output generation score observable is given by:

$$O_U^H = \sum_z 1_{Np_U(z) \geq \log 2} |z\rangle\langle z| \quad (11)$$

$1_{Np_U(z) \geq \log 2}$ is equal to 1 if $Np_U(z) \geq \log 2$ and is otherwise equal to 0, and $|z\rangle$ represents an output state corresponding to the particular bit string z.

Since the selected observable depends on a particular instance of a random quantum circuit (i.e., a respective random sampling of single qubit gates and circuit depth), the system defines a respective observable for each defined random quantum circuit.

The expectation value of the observable $O_U$ with respect to the output $\rho_U$ of an experimental noisy implementation of the random quantum circuit U can be given by Equation (12) below.

$$Tr \rho_U O_U = \alpha \langle\psi_U|O_U|\psi_U\rangle + (1-\alpha) Tr \chi_U O_U \quad (12)$$

In Equation (12), $\chi_U$ represents a density matrix representing the effect of errors in the experimental implementation of the random quantum circuit.

The selected observable $O_U$ has the property that the expectation value of the selected observable with respect to the density matrix representing the effect of errors in the experimental implementation of the quantum circuit (i.e., Tr $\chi_U O_U$, appearing in the second term of the right hand side of Equation (12)) obeys a concentration of measure about an expectation value of the selected observable. That is, the expectation value Tr $\chi_U O_U$ gives $$Tr\chi_U O_U = \frac{Tr\, O_U}{N} \pm \epsilon = N_U \pm \epsilon \qquad (13)$$

where $$N_U = \frac{Tr O_U}{N}$$

represents a typical value that is independent of $\chi_U$, $N=2^n$ represents the size of the corresponding Hilbert space, and E represents a correction. Verification of this property can be performed numerically by introducing a digital error and calculating a corresponding observable, or through analysis of the corresponding Pearson correlation coefficient between an ideal output distribution and the distribution with one digital error.

The system determines an estimate of the fidelity $\hat{\alpha}$ for each defined random quantum circuit (step 306). The system estimates the fidelity $\hat{\alpha}$ for a respective random quantum circuit by solving Equation (12) for the random quantum circuit. That is, the system estimates the expectation value $Tr\rho_U O_U$ (left hand side of Equation 12) of the selected observable $O_U$ with respect to the output $\rho_U$ of an experimental implementation of the random quantum circuit.

To estimate the expectation value $Tr\rho_U O_U$ for a respective circuit U, the system approximates the expectation value $Tr\rho_U O_U$ as a sum of $N_U = Tr\, O_U/N$ (the trace of the selected observable $)O_U)=Tr\, O_U$ divided by N) added to the fidelity of the quantum circuit $\alpha$ multiplied by a difference between i) $V_U$ (an expectation value of the selected observable with respect to an ideal output state of the quantum circuit $\langle \psi_U|O_U|\psi_U\rangle$) and $N_U=Tr\, O_U/N$ (the trace $Tr\, O_U$ divided by N). That is, the system approximates $$Tr\rho_U O_U = R_U \simeq a(\langle\psi_U|O_U|\psi_U\rangle - Tr\, O_U/N) + Tr\, O_U/N \qquad (14)$$
$$= a(V_U - N_U) + N_U$$

by assuming that the correction $\epsilon$ tends to zero to determine an estimate of the fidelity of the quantum circuit $\hat{\alpha}$. The assumption that the correction $\epsilon$ tends to zero can be verified numerically. For example, in a model where bit-flip (Pauli matrix $\sigma_x$) or phase-flip (Pauli matrix $\sigma_z$) errors after each gate are considered, it can be verified numerically that $$\langle\psi_0|(U^e_{g,j})^\dagger O_U U^e_{g,j}|\psi_0\rangle \simeq N_U \pm \epsilon$$

where $U_{g,j}^e$ represents a circuit obtained when adding $\sigma_j$ after gate g. When the output $|\psi_U\rangle$ of the random circuit U approximates a Haar random state or Porter-Thomas distribution, this assumption works well and a typical error can be expected to have a statistical fluctuation $\epsilon \cong 2^{-n/2}$.

The system can estimate $R_U$ in Equation (14) experimentally by performing a plurality of measurements of the selected observable $O_U$ to determine an estimate $\hat{R}_U$. This can include repeatedly preparing a quantum system (register of qubits) in an initial state, applying the quantum circuit U to the quantum system prepared in the initial state to generate an evolved state of the quantum system, and measuring the observable with respect to the evolved state of the quantum system to obtain multiple measurement results that can be used to determine the estimate $\hat{R}_U$, e.g., through averaging of the multiple measurement results.

For example, the action of a selected observable $O_U = \Sigma_z O_U(z)|z\rangle\langle z|$ maps each bit string or measurement outcome z to a real value $O_U(z)$. Each value $O_U(z)$ depends on the random circuit U, and the calculation of experimental values $\{O_U(z_j)\}$ requires classical simulations of U. For a set of M measurement results $\{z_j\}$ the estimate of $R_U$ can be given by $$\hat{R}_U = \frac{1}{M}\sum_{z_j} O_U(z_j)$$

which in turn gives $$R_U = \hat{R}_U + O\left(\frac{1}{\sqrt{M}}\right),$$

as described above with reference to Equations (6) and (7).

The system can determine estimates $\hat{V}_U$ and $\hat{R}_U$ for $V_U$ and $N_U$ in Equation (14) numerically or analytically. For example, in some implementations the output state $\rho_U$ given by Equation (9) above may approximate a Porter-Thomas distribution. In these implementations the values of $V_U$ and $N_U$ in Equation (14) can be determined analytically. Values of $V_U$ and $N_U$ in Equation (14) can be determined numerically by calculating $V_U = \langle\psi_U|O_U|\psi_U\rangle$ and $N_U = Tr\, O_U/N$ with classical simulations.

The system determines the estimate of the fidelity $\hat{\alpha}$ of the random quantum circuit U using the determined estimate $\hat{R}_U, \hat{V}_U$ and $\hat{N}_U$. That is, the system solves for $\hat{\alpha}$ in Equation (14) using $\hat{R}_U, \hat{V}_U$ and $\hat{N}_U$. The system can then determine an average of the determined estimates for each random quantum circuit to obtain an estimate of circuit fidelity at the circuit depth d and number of qubits n.

In some implementations the system may further perform statistical tests to gather more information about the quantum circuit or the estimation of the fidelity of the quantum circuit, as described in more detail below with reference to FIG. 4.

In some implementations the system may further determine one or more properties of the random quantum circuit using individual estimations of the fidelity of a random quantum circuit $\hat{\alpha}$, an average estimate of fidelity and/or additional information about the random quantum circuit obtained using the example process 400 described below with reference to FIG. 4. For example, the estimated fidelity $\hat{\alpha}$ may be used to determine the performance of the random quantum circuit. As another example, the estimated fidelity may be used to (i) calibrate, (ii) validate, or (iii) benchmark quantum computing hardware implementing the quantum circuit.

In some implementations the system can determine one or more adjustments to quantum computing hardware using the determined fidelity estimates and/or additional information about the random quantum circuit. For example, the system can determine adjustments to control parameters of a control model used by the quantum computing hardware to implement quantum operations to improve the fidelity of the quantum operations. The system can use the adjusted control model to implement the quantum operations with increased fidelity in future quantum computations.

Figure 4:
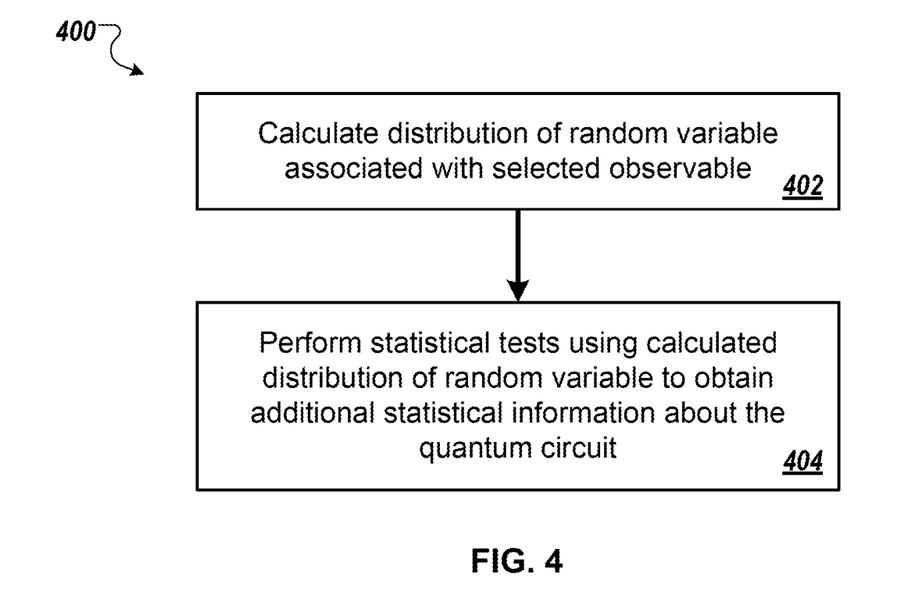
FIG. 4 is a flow diagram of an example process for determining properties of a quantum circuit.

FIG. 4 is a flow diagram of an example process 400 for obtaining additional information about a quantum circuit. For example, example process 400 can be applied in conjunction with processes 200 and 300 described above. For convenience, the process 400 will be described as being performed by a system of one or more classical computing devices located in one or more locations. For example, the system 100 of FIG. 1, appropriately programmed in accordance with this specification, can perform the process 400.

The system calculates a distribution of a random variable associated with the observable selected at step 204 or 304 of example processes 200 and 300 (step 402).

The system performs statistical tests using the calculated distribution of random variables associated with the selected observable to obtain additional statistical information about the quantum circuit (step 404). For example, the system can validate fidelities estimated using process 200 or 300 by performing a Kolmogorov-Smirnov test using experimental data, e.g., data obtained based on Equation (6), to reject the null hypothesis that the fidelity estimates are 0. As another example, the system can determine a Kolmogorov-Smirnov p-value for the cumulative distribution function of the experimental data given the estimate of the fidelity $\alpha$. A large Kolmogorov-Smirnov p-value indicates that the assumptions of the model and the estimate of alpha are correct.

For example, one example observable that the system may select at step 204 or 304 of example process 200 or 300 is the cross entropy benchmarking observable given by Equation (15) below.

$$O_U^X = \sum_z \log N p_U(z) |z\rangle\langle z| = \sum_z Y(z)|z\rangle\langle z| \qquad (15)$$

In Equation (15), $N=2^n$ where n represents the number of qubits on which the quantum circuit operates, $p_U(z)$ represents a probability that circuit U outputs a particular bit string z and $|z\rangle$ represents an output state corresponding to the particular bit string z.

For a noisy implementation of a given quantum circuit U, $Pr_{U,\alpha}(Y \leq s) = \sum_{z \text{ such that } \log N p_U(z) \leq s} P_\alpha^U(Z)$ where $P_\alpha^U(z) = \langle z|\rho_U|z\rangle = \alpha p_U(z) + (1-\alpha)/N$. When sampling over random circuits, the distribution of the random variable $Y(z) = \log N p_U(z)$ is $F_y(S) = \langle P_{U,\alpha}(Y \leq s) \rangle_U = e^{-e^s}(-e^s\alpha + e^{e^s} - 1)$. Therefore the random variable Y over noisy random circuits has probability density $e^{y-e^y}(\alpha(e^y-1)+1)$. The expectation value of this random variable is $\alpha - \gamma$ (where $\gamma$ represents Euler's constant) which gives an estimator $\hat{\alpha} \approx \hat{R}_U^X + \gamma$ of fidelity $\alpha$, where $\hat{R}_U^X$ represents the expectation value of the observable $O_U^X$ in Equation (15). The variance of the estimator $\hat{\alpha}$ is $\pi^2/6 - \alpha^2$ and the standard deviation of the estimator $\hat{\alpha}$ with M measurements is $$\sqrt{\left(\frac{\pi^2}{6} - a^2\right)/M}.$$

As another example, one example observable that the system may select at step 204 or 304 of example process 200 or 300 is the linear cross entropy observable given by Equation (16) below.

$$O_U^L = \sum_z N p_U(z)|z\rangle\langle z| \qquad (16)$$

The random variable $X(z) = N p_U(z)$ has distribution $Pr_{U,\alpha}(X \leq t) = \sum_z 1_{\{Np_U(z) \leq t\}} P_\alpha^U(z)$ and when sampling over noisy random circuits the distribution of X(z) is $F_x(s) = \langle P_{U,\alpha}(X \leq t) \rangle_U = \int_0^t (\alpha x + 1 - \alpha)e^{-x}dx$. Therefore the random variable X over noisy random circuits has probability density $(\alpha x + 1 - \alpha)e^{-x}$. The expectation value of this random variable is $1+\alpha$ which gives an estimator $\hat{\alpha} = \hat{R}_U^L + 1$ of $\alpha$, where $\hat{R}_U^L$ represents the expectation value of the observable $O_U^L$ in Equation (16). The variance of the random variable is $1 + 2\alpha + \alpha^2$, which gives a standard deviation of $\sqrt{(1+2\alpha+\alpha^2)/M}$ for the estimator $\hat{\alpha}$ with M measurements—an improvement to the standard deviation obtained using the cross entropy benchmarking observable.

As another example, one example observable that the system may select at step 204 or 304 of example process 200 or 300 is the heavy output generation score observable given by Equation (17) below.

$$O_U^H = \sum_z 1_{N p_U(z) \geq \log 2}|z\rangle\langle z| \qquad (17)$$

The expectation value of this observable for an output of fidelity $\alpha$ is $$R_U^H = \int_{\log 2}^\infty (\alpha x + 1 - \alpha)e^{-x}dx = \frac{1}{2}(1 + \alpha\log 2).$$

The corresponding estimator is $\hat{\alpha} = (2\hat{R}_U^H - 1)/\log 2$ where $\hat{R}_U^H$ represents the expectation value of the observable $O_U^H$ in Equation (17), and the variance is $(\log 2)^{-2} - \alpha^2$.

Additional statistical information about the quantum circuit obtained via the statistical tests can also be used to determine properties of the quantum circuit, as described in step 208 and step 308 of processes 200 and 300.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for estimating the fidelity of an n-qubit quantum logic gate, the method comprising:
defining multiple sets of random quantum circuits, wherein the multiple sets of random quantum circuits correspond to different respective depths and each set in the multiple sets of random quantum circuits comprises random quantum circuits with a same circuit depth d, wherein defining the multiple sets of random quantum circuits comprises, for each set of random quantum circuits:
defining one or more elements of the set of random quantum circuits, comprising, for each element:
randomly sampling d*n single qubit gates from a predefined set of single qubit gates, wherein each single qubit gate operates on a respective qubit at a respective cycle; and
defining the element of the set of random quantum circuits as equal to d cycles of n randomly sampled single qubit gates followed by the n-qubit quantum logic gate;
for each set of random quantum circuits:
selecting an observable for each element in the set of random quantum circuits, wherein each selected observable corresponds to a respective element of the set of random quantum circuits and is dependent on the element to which it corresponds; and
estimating a value of a polarization parameter for the set of random quantum circuits, comprising performing a least mean squares minimization based on multiple expectation values, wherein each expectation value comprises an expectation value of a respective selected observable with respect to an output of an experimental implementation of a random quantum circuit corresponding to the respective selected observable; and
processing the estimated polarization parameter values to obtain an estimate of the fidelity of the n-qubit quantum logic gate.

2. The method of claim 1, wherein estimating a value of a polarization parameter for the set of random quantum circuits further comprises determining the multiple expectation values, comprising, for each expectation value:
defining the expectation value of the respective selected observable with respect to an output of an experimental implementation of a random quantum circuit corresponding to the respective selected observable as
i) a trace of the respective selected observable divided by the size of Hilbert space, added to
ii) a polarization of the random quantum circuit multiplied by a difference between an expectation value of the respective selected observable with respect to an ideal output state of the random quantum circuit and the trace of the respective selected observable divided by the size of Hilbert space;
estimating values of i) the expectation value of the respective selected observable with respect to an ideal output state of the random quantum circuit, and ii) the trace of the respective selected observable divided by the size of Hilbert space, numerically; and
estimating a value of the expectation value of the respective selected observable with respect to an output of an experimental implementation of the random quantum circuit experimentally.

3. The method of claim 2, wherein estimating a value of the expectation value of the respective selected observable with respect to an output of an experimental implementation of the random quantum circuit experimentally comprises:
repeatedly:
preparing a quantum system in an initial state;
applying the random quantum circuit to the quantum system prepared in the initial state to generate an evolved state of the quantum system; and measuring the respective selected observable with respect to the evolved state of the quantum system; and averaging the measured selected observables to estimate the value of the expectation value of the respective selected observable with respect to an output of an experimental implementation of the random quantum circuit.

4. The method of claim 1, wherein performing the least squares minimization comprises:
minimizing a sum of squared residuals, each squared residual corresponding to a respective element in the set of random quantum circuits, and each squared residual comprising a square of
  i) a trace of the respective selected observable divided by the size of Hilbert space, added to
  ii) the value of the polarization parameter for the set of the random quantum circuits multiplied by a difference between an expectation value of the respective selected observable with respect to an ideal output state of the random quantum circuit and the trace of the respective selected observable divided by the size of Hilbert space, minus
  iii) the expectation value of the respective selected observable with respect to an output of an experimental implementation of the random quantum circuit corresponding to the respective selected observable.

5. The method of claim 1, wherein processing the estimated polarization parameter values to obtain an estimate of the fidelity of the n-qubit quantum logic gate comprises:
fitting the estimated polarization parameter values corresponding to each circuit depth d as an exponential decay in d;
determining an estimated polarization per cycle pay for the n-qubit quantum logic gate based on the exponential decay in d and an obtained estimate of polarization for a single qubit gate in a quantum circuit that operates on n qubits; and
determining an estimate of the fidelity of the n-qubit quantum logic gate using $F=p_n+ (1-p_n)/D$, where $D=2^n$ represents the Hilbert space dimension.

6. The method of claim 1, wherein the n-qubit quantum logic gate operates on at most 5 qubits.

7. The method of claim 1, wherein the selected observables are diagonal in the computational basis.

8. The method of claim 1, wherein the selected observables comprise a cross entropy benchmarking observable, a linear cross entropy observable, or a heavy output generation score observable.

9. The method of claim 1, further comprising determining one or more properties of quantum hardware implementing the n-qubit quantum logic gate using the estimate of the fidelity of the n-qubit quantum logic gate.

10. The method of claim 1, further comprising:
determining one or more adjustments to quantum hardware control parameters based on the determined estimate of the fidelity; and
implementing the determined one or more adjustments to perform quantum computations using quantum computing hardware.

11. The method of claim 1, further comprising:
calculating a distribution of a random variable associated with the selected observables; and performing one or more statistical tests using the calculated distribution of the random variable to obtain additional information about the n-qubit quantum logic gate.

12. The method of claim 11, wherein performing one or more statistical tests using the calculated distribution of the random variable to obtain additional information about the n-qubit quantum logic gate comprises performing a Kolmogorov-Smirnov test to validate the estimated fidelity of the n-qubit quantum logic gate.

13. An apparatus comprising:
one or more classical processors; and
quantum computing hardware in data communication with the one or more classical processors;
wherein the apparatus is configured to perform the method of claim 1.

14. A method for estimating the fidelity of a quantum circuit, the method comprising:
defining one or more random quantum circuits, wherein each of the one or more random quantum circuits has a same circuit depth d and operates on a same number of qubits n, wherein defining a random quantum circuit comprises:
  randomly sampling d*n single qubit gates from a predefined set of single qubit gates, wherein each single qubit gate operates on a respective qubit; and
  defining the random quantum circuit as equal to d cycles of n randomly sampled single qubit gates followed by multiple multi-qubit quantum logic gates acting on different qubits;
selecting, for each defined random quantum circuit, an observable for the random quantum circuit, wherein i) the selected observable is dependent on the random quantum circuit, and ii) an expectation value of the selected observable with respect to a density matrix representing an effect of errors in an experimental implementation of the random quantum circuit obeys a concentration of measure about an expectation value of the selected observable; and
determining, for each defined random quantum circuit, an estimate of the fidelity of the random quantum circuit, comprising, for each random quantum circuit, estimating an expectation value of the respective selected observable with respect to an output of an experimental implementation of the random quantum circuit.

15. The method of claim, 14, wherein estimating an expectation value of the selected observable with respect to an output of an experimental implementation of a random quantum circuit comprises:
approximating the expectation value of the selected observable with respect to an output of an experimental implementation of the random quantum circuit as a sum of a trace of the selected observable divided by Hilbert space size added to the fidelity of the quantum circuit multiplied by a difference between i) an expectation value of the selected observable with respect to an ideal output state of the quantum circuit and the a trace of the selected observable divided by Hilbert space size;
estimating a value of the expectation value of the selected observable with respect to an output of an experimental implementation of the random quantum circuit experimentally;
estimating values of i) the expectation value of the selected observable with respect to an ideal output state of the random quantum circuit, and ii) the trace of the respective selected observable, numerically or analytically.

16. The method of claim 15, wherein estimating a value of the expectation value of the selected observable with respect to an output of an experimental implementation of the random quantum circuit experimentally comprises:
repeatedly:
preparing a quantum system in an initial state;
applying the random quantum circuit to the quantum system prepared in the initial state to generate an evolved state of the quantum system; and
measuring the respective selected observable with respect to the evolved state of the quantum system; and
averaging the measured selected observables to estimate the value of the expectation value of the selected observable with respect to an output of an experimental implementation of the random quantum circuit.

17. The method of claim 16, wherein the method comprises analytically estimating values of i) the expectation value of the selected observable with respect to an ideal output state of the random quantum circuit, and ii) the trace of the respective selected observable, and wherein the output of the experimental implementation of the random quantum circuit is approximated by a Porter-Thomas distribution.

18. The method of claim 14, further comprising determining an average of the determined estimates of fidelity for each random quantum circuit to obtain an average estimate of circuit fidelity at the circuit depth d and number of qubits n.

19. The method of claim 14, wherein the quantum circuit operates on 10 or more qubits.

20. The method of claim 14, wherein the selected observables are diagonal in the computational basis.

21. The method of claim 14, wherein the selected observables comprise a cross entropy benchmarking observable, a linear cross entropy observable, or a heavy output generation score observable.

22. The method of claim 14, further comprising determining one or more properties of quantum hardware implementing the quantum circuit using the determined estimates of the fidelity or the average estimate of circuit fidelity.

23. The method of claim 14, further comprising:
determining one or more adjustments to quantum hardware control parameters based on the determined estimates of fidelity; and
implementing the determined one or more adjustments to perform quantum computations using quantum computing hardware.

24. The method of claim 14, further comprising:
calculating a distribution of a random variable associated with the selected observables; and
performing one or more statistical tests using the calculated distribution of the random variable to obtain additional information about the quantum circuit.

25. The method of claim 24, wherein performing one or more statistical tests using the calculated distribution of the random variable to obtain additional information about the quantum circuit comprises performing a Kolmogorov-Smirnov test to validate the estimated fidelity of the quantum circuit.

26. An apparatus comprising:
one or more classical processors; and
quantum computing hardware in data communication with the one or more classical processors;
wherein the apparatus is configured to perform the method of claim 14.

* * * * *